United States Patent Office 3,197,578
Patented July 27, 1965

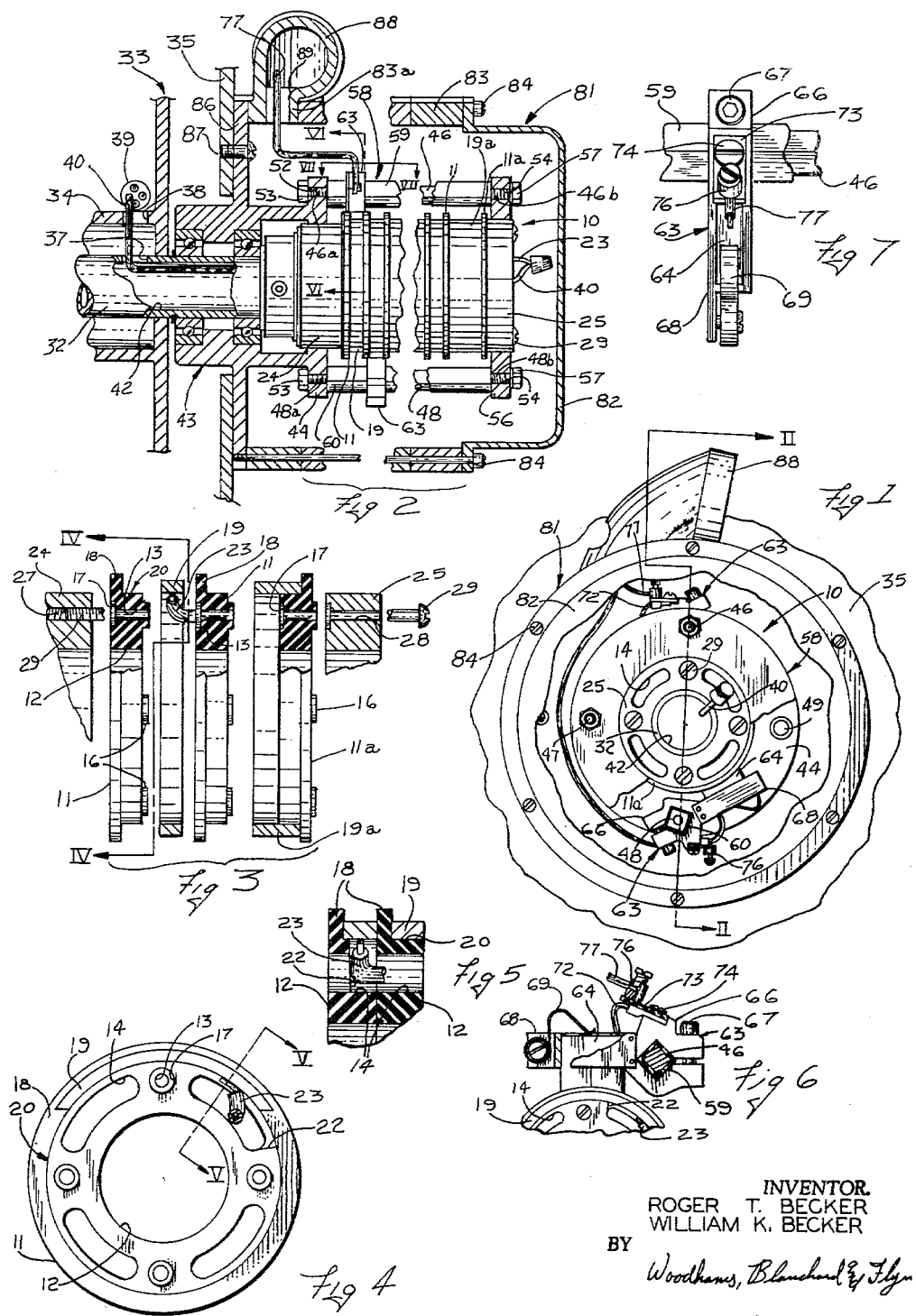

3,197,578
COLLECTOR RING ASSEMBLY
Roger T. Becker, Kalamazoo, and William K. Becker, Ross Township, Kalamazoo County, Mich., assignors to Aero-Motive Manufacturing Company, Kalamazoo, Mich., a corporation of Michigan
Filed July 20, 1962, Ser. No. 211,193
3 Claims. (Cl. 191—12.4)

This invention relates in general to a collector ring assembly and, more particularly, to a type thereof which is particularly adapted for conducting electrical potential from a stationary supply to an electrical conductor carried on the rotatable drum of an electric cord reel.

Collector rings have long been in use for the purpose of conducting electrical potential between a supply and an output conductor which is supported for relative rotational movement with respect to the supply. However, during much of this time there has been an unfilled need for a collector ring assembly which can be easily adapted to accommodate specific quantities of output conductors without materially changing the type of basic and/or component parts utilized in the assembly. Heretofore it has frequently been necessary to change the entire assembly in order to adapt same for an increased quantity of electrical output conductors. Alternatively, it has often been necessary to provide, at a loss, a collector ring assembly in which only part of the rings are utilized. In some instances, this partially used assembly has been required to provide for a sudden or anticipated increase in output conductors. In other instances, it has simply been economically unfeasible, according to prior art teachings, to provide the necessary variations to meet each specific need. Thus, the existing arrangement has often resulted in an excessive cost and/or an inefficient use of space.

Accordingly, a primary object of this invention has been the provision of an improved collector ring assembly wherein the number of conductors served by the assembly can be increased or decreased merely by adding or subtracting relatively inexpensive component parts at a minimum of cost.

A further object of this invention has been the provision of a collector ring assembly, as aforesaid, which is rugged in construction, completely reliable in operation, inexpensive to fabricate and assemble, relatively easy to modify for changing requirements, and which requires little or no maintenance.

A further object of this invention has been the provision of a collector ring assembly, as aforesaid, which is light in weight, relatively small in size and which is adaptable for use with an electrical cord reel assembly.

Other objects and purposes of this invention will become apparent to persons familiar with this type of equipment upon reading the following descriptive material and examining the accompanying drawings, in which:

FIGURE 1 is a broken end view of a collector ring assembly embodying the invention and including the adjacent portion of a cord reel housing.

FIGURE 2 is a broken, sectional view substantially as taken along the line II—II in FIGURE 1, and including portions of a cord reel assembly.

FIGURE 3 is a broken and exploded view of a fragment of FIGURE 2.

FIGURE 4 is a sectional view taken along the line IV—IV in FIGURE 3.

FIGURE 5 is a sectional view taken along the line V—V in FIGURE 4.

FIGURE 6 is a sectional view taken along the line VI—VI in FIGURE 2.

FIGURE 7 is a sectional view taken along the line VII—VII in FIGURE 2.

For convenience in description, the terms "upper," "lower" and words of similar import will have reference to the collector ring assembly as appearing in FIGURES 1 and 2. The words "inner," "outer" and derivatives thereof will have reference to the geometric center of the collector ring assembly and parts associated therewith.

*General description*

The objects and purposes of the invention, including those set forth above, have been met by providing a collector ring assembly including a plurality of similar, electrically nonconductive and annular members which are arranged in side-by-side and coaxial positions for connection to and rotation with a rotating member. Each of said annular members is encircled by an electrically conductive ring and each is removably held against relative rotation with respect to the other members by cooperating projections and recesses on adjacent members. Brush means is supported adjacent each electrically conductive ring for engagement thereby, the brush means being mounted upon structure which supports the rotating member. The annular members are provided with suitable openings through which conductors can be threaded for electrical connection to the electrically conductive rings.

Where the ring assembly is used in association with a cord reel, the rotative member is preferably a hollow shaft connected to the cord reel drum so that the electrical conductors mounted upon the drum can be threaded through the shaft and electrically connected to those conductors which are connected to the electrically conductive rings.

*Detailed construction*

The collector ring assembly 10 (FIGURE 2) is comprised of a plurality of similar, electrically nonconductive and annular members 11 (FIGURE 3) which may be fabricated from a conventional, electrically nonconductive material such as Bakelite. Each annular member 11 has a central opening 12, a plurality of bolt openings 13 and a plurality of conductor openings 14 (FIGURE 1) around and spaced outwardly from the central opening. The bolt openings 13 which are preferably alternated with the conductor openings 14, are concentrically encircled at one end of each on the same side of each annular member by annular projections 16. The opposite ends of said bolt openings are concentrically encircled by annular recesses 17. The recesses 17 on each annular member are arranged for snug, slidable reception of the projections on another annular member, whereby relative radial and rotational movement between adjacent annular members is positively prevented and axial alignment is positively maintained. Each annular member 11 preferably has a single, annular and external flange 18 adjacent one axial side thereof.

The peripheral surface 20 (FIGURES 4 and 5) of each annular member 11 is snugly embraced by an electrically conductive ring 19 which can be fabricated from copper, for example. The ring 19 preferably extends from the flange 18 on one annular member to the flange 18 on the next annular member.

As shown in FIGURE 3, the projections 16 and recesses 17 on the annular member 11a are reversed so that an oversized ring 19a can be mounted between the external flanges 18 on the annular member 11a and the annular member 11 adjacent thereto.

As shown in FIGURE 4, one or more of the conductor openings 14 in each annular member 11 may be connected to a radial opening 22 through which conductors 23 can extend for electrical connection to the conductive ring 19 encircling the member. Each electrical conductor 23 (FIGURE 5) extends through the conductor openings 14 in the annular members 11 which are disposed to the right thereof. A pair of annular end members 24 and 25 are located at the opposite axial ends of the plurality of annular members 11, and said end members are provided with bolt openings 27 and 28, respectively, through which the bolts 29 can be received when said bolts are threaded through the bolt openings 13 in the annular members 11 (FIGURE 3). The bolt openings 27 are threaded for threaded reception and engagement of the threaded ends of the bolts 29, whereby the annular members 11 are snugly held against axial movement away from each other and with respect to the end members 24 and 25.

As shown in FIGURE 2, the end member 24 may be a collar which is coaxially mounted and firmly secured upon one end of a hollow shaft 32 which is part of a cord reel assembly 33 including a cord reel drum 34 and a reel housing 35.

Appropriate openings 37 and 38 (FIGURE 2) are provided through the shaft 32 and through the drum 34, respectively, for threading the conductors 40 of the cord reel cable 39 into and through the central opening 42 through the hollow shaft 32, so that they can be connected (FIGURE 2) to the conductors 23, which are connected to the rings 19.

In this particular embodiment, the shaft 32 (FIGURE 2) is rotatably supported in a bearing assembly 43 which is concentrically mounted upon the reel housing 35. The bearing assembly 43 includes a flange 44 which encircles the end member 24. A plurality, here four, of substantially parallel rods 46, 47, 48 and 49 (FIGURE 1) are secured to, and extend in the same direction away from, the flange 44. In this particular embodiment, the rods 46, 47, 48 and 49 have reduced and threaded end portions, such as those shown at 46a and 48a, which are slidably received through appropriate openings 52 in the flange 44 for engagement by the nuts 53. The rods 46, 47, 48 and 49 have reduced and threaded end portions, such as those shown at 46b and 48b, which are received through appropriate openings 54 in a substantially flat ring 56, which snugly and concentrically encircles the annular end member 25 (FIGURE 2). The ring 56 is held in place with respect to said rods by the nuts 57. Accordingly, the frame structure 58 including the rods 46, 47, 48 and 49, the flange 44 and the ring 56 is supported upon the bearing assembly 43. The frame structure 58 supports the outboard end of the plurality of nested annular members 11 and also holds the brush supports 63, as discussed hereinafter.

The rods 47 and 49 (FIGURE 1) may be substantially circular in cross section, but the rods 46 and 48 (FIGURES 6 and 1) are preferably rectangular in cross section. The rods 46 and 48 have sleeves 59 and 60 of rectangular cross section, which sleeves are snugly supported upon said rods between the flange 44 and the ring 56. A plurality of brush supports 63 (FIGURES 6 and 7) are supported upon the sleeves 59 and 60, hence upon the rods 46 and 48, so that their brushes 64 are in engagement with the peripheral surfaces of the electrically conductive rings 19.

More specifically, each brush support 63 (FIGURES 6 and 7) has a bifurcated mounting head 66 which substantially embraces the sleeve 59 on the rod 46, for example. A clamp screw 67 is received through appropriate openings in the two arms of the mounting head 66 for clamping same upon the sleeve 59, hence upon the rod 46. A brush retainer 68 is connected to the mounting head and extends over and near one of the annular members 11. A brush 64 is slidably held within the brush retainer 68 for engagement with one of the rings 19. A spring 69 is mounted upon the brush retainer 68 for engagement with the end of the brush 64 remote from its ring 19, whereby the brush 64 is continuously and resiliently urged against said ring 19.

The brush 64 (FIGURE 6) is electrically connected to one end of a conductor 72, the other end of which is clamped to the mounting head 66 of the brush support 63 by an electrically conductive bar 73, which is held in place by a screw 74. A terminal post 76 is connected to the bar 73 for engagement with one end of an electrical conductor 77 which leads from the ring assembly 10 to a source (not shown) of electrical potential. Accordingly, electrical energy from said source passes through the conductor 77, the terminal post 76, the bar 73, the conductor 72 and the brush 64 to the electrically conductive ring 19 supported on an annular member 11.

The ring assembly 10 (FIGURE 2) may be disposed within a collector ring housing 81 having an axial end wall 82 and a peripheral wall defined by a plurality of coaxial and adjacent cylinders 83 of relatively short axial length. The cylinders 83 are held in place with respect to each other by elongated screws 84 which are received through axially extending screw openings in the walls of the cylinders. The threaded ends of the screws 84 can be threadedly received into the flange 86, which encircles the bearing assembly 43 midway between the axial ends thereof. The flange 86 is secured to the reel housing 35 by means of the screws 87, and thereby supports the bearing assembly 43, hence the frame structure 58, upon the housing.

One of the cylinders 83, here the cylinder 83a (FIGURE 2), has an integral outlet pipe 88 which communicates with a radial opening 89 in the cylinder 83a through which the conductors 77 can be passed for connection to said source. The number of cylinders 83 can be varied with the number of annular members so that the end wall 82 of the ring housing 81 may be adjacent to, but properly spaced from, the outboard end of the frame structure 58, hence of the ring assembly 10.

Assembly and operation

Where the ring assembly 10 is used with a cord reel assembly 33 (FIGURE 2) the bearing assembly 43 may be mounted upon the reel housing 35. The inboard end member 24 is mounted upon the shaft 32, after which the rings 19 are mounted with their conductors 23 upon the required number of annular members 11. The annular members 11 in the proper amount are connected together by means of their projections 16 and recesses 17, and the conductors 23 are threaded through the conductor openings 14 (FIGURE 4) of the annular members 11 as they are assembled. The outboard annular end member 25 is then placed adjacent the outermost annular member 11, after which the elongated bolts 29 are inserted as required for securing the annular members 11 and the end members 24 and 25 with respect to each other.

The rods 46, 47, 48 and 49 are placed in position with respect to the flange 44. The sleeves 59 and 60, as well as the brush supports 63, are mounted upon the rods 46 and 48, after which the ring 56 is mounted upon said rods. It will be seen that ring assemblies of different axial lengths can be easily provided merely by changing the lengths of the rods 46, 47, 48 and 49, the lengths of the bolts 29 and the number of annular members 11 and rings 19 therefor.

A brush 64 is placed within the brush retainer 68 on each brush support 63, and said brush supports 63 are then adjusted axially of the ring assembly 10 until each brush is in proper engagement with a ring 19. The screws 67 are tightened to hold the brush supports 63 in their proper positions. The conductors 40 in the cable 39, which extend through the central opening 42 in the shaft 32 (FIGURES 1 and 2), are now connected to the appropriate conductors 23 to complete the circuit from the cable 39 to the rings 19. The conductors 77 are then connected to the terminal posts 76 and to a source of electrical potential (not shown). Where the ring housing 81 is desired, it is mounted upon the flange 86 by means of the screws 84, and the conductors 77 are threaded through the outlet pipe 88 thereof.

Although a particular, preferred embodiment of the invention has been disclosed above for illustrative purposes, it will be understood that variations or modifications of

What is claimed is:

1. A collector ring assembly for conducting electrical potential from a source to a conductor rotatable with respect to said source, comprising:
a plurality of similar, electrically nonconductive and annular members arranged in side-by-side abutting relation, each nonconductive member having a cylindrical body and an external, annular flange near one axial side thereof and a pair of openings extending axially therethrough, one of said openings being centrally located and the other of said openings being spaced radially outwardly from said one opening, each nonconductive member having a plurality of circumferentially spaced projections on one axial side thereof and a plurality of corresponding recesses on the other axial side thereof, the projections on one nonconductive member being snugly and slidably receivable into the recesses on another nonconductive member to prevent relative radial and rotative movement of the two members, and each nonconductive member having a radially disposed opening extending through the peripheral surface thereof and communicating with said other opening therein;
holding means including a pair of annular end members holding said nonconductive members together and against axial movement away from each other;
an electrically conductive annular ring of relatively small radial thickness snugly embracing and encircling the cylindrical portion of each of said nonconductive members and snugly disposed between the flange thereof and the flange of the adjacent nonconductive member;
frame structure including a pair of annular support members respectively encircling said end members and a plurality of rigid, spaced and parallel elements extending between and connected to said support members;
brush support means supported upon at least one of said elements, and brush means held by said support means for electrically conductive engagement with each of said rings.

2. The structure of claim 1 wherein said holding means is connected to a hollow shaft so that said nonconductive members are coaxial with said shaft;
wherein said brush support means are adjustable lengthwise of, and are supported on, two of said elements which are disposed on diametrically opposite sides of said nonconductive members; and
including an electrical conductor extending through the shaft, through the concentric and eccentric openings in said nonconductive members and through one of said radial openings, said conductor being connected to one of said electrically conductive rings.

3. An assembly for rotatably supporting an electrical conductor and for connecting said conductor to a source of electrical energy, the combination comprising:
a support structure;
a hollow shaft rotatably mounted upon said support structure;
a cord reel drum coaxially mounted upon and rotatable with said shaft;
a plurality of similar, electrically nonconductive, annular and coaxial members arranged in side-by-side abutting relation, each nonconductive member having a cylindrical body and an external, annular flange adjacent one axial side thereof and a plurality of openings extending axially therethrough, one of said openings being centrally located and the others of said openings being spaced radially outwardly from said one opening, each nonconductive member having a plurality of circumferentially spaced projections on one axial side thereof and a plurality of corresponding recesses on the other axial side thereof, the projections on one nonconductive member being snugly and slidably receivable into the recesses on another nonconductive member to prevent relative radial and rotative movement of the two members when their concentric openings are coaxial, and each nonconductive member having a radially disposed opening extending through the peripheral surface thereof and communicating with one of said other openings therein;
holding means including a pair of annular end members and screw means securing said nonconductive members together and holding them against axial movement away from each other, at least one of said end members being rigidly secured to said shaft;
a plurality of electrically conductive annular rings of relatively small radial thickness, each ring snugly embracing and encircling the cylindrical portion of one of said nonconductive members and snugly disposed between the flange thereof and the flange of the adjacent nonconductive member;
frame structure including a pair of annular support members respectively encircling said end members and a plurality of rigid, spaced and parallel elements extending between and connected to said support members, one of said support members being rigidly connected to said support structure, and the other support member snugly and slidably embracing its respective end member, two of said elements being disposed on diametrically opposite sides of said nonconductive members;
a plurality of brush holders mounted upon said elements and adjustable lengthwise thereof, and brush means held in each brush holder and resiliently urged against one of said rings;
first electrical conductor means supported upon said drum extending through said hollow shaft and through the openings in said nonconductive members and connected to said rings; and
second electrical conductor means connected to said brush holders and connectible to said source.

References Cited by the Examiner

UNITED STATES PATENTS

| 1,747,411 | 2/30 | Anderson | 339—5 |
| 1,870,236 | 8/32 | Chervenka | 310—232 |
| 2,494,244 | 1/50 | Jonard et al. | 339—5 X |
| 2,696,570 | 12/54 | Pandapas | 310—232 |
| 2,931,999 | 4/60 | Lemmerman | 339—5 |

FOREIGN PATENTS

| 1,216,141 | 11/59 | France. |
| 617,762 | 2/49 | Great Britain. |

JOSEPH D. SEERS, *Primary Examiner.*